Figure 1:
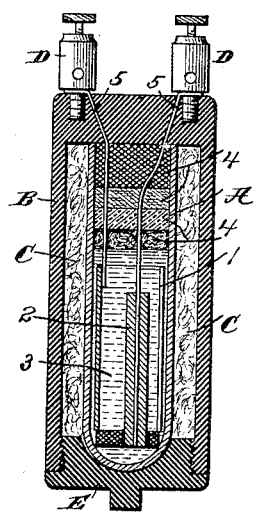

(No Model.)

C. WILLMS.
GALVANIC BATTERY.

No. 450,840. Patented Apr. 21, 1891.

Attest:
Geo. H. Botts
C. J. Sawyer

Inventor:
Charles Willms
by Philipp, Phelps Huey
Attys

UNITED STATES PATENT OFFICE.

CHARLES WILLMS, OF BALTIMORE, MARYLAND.

GALVANIC BATTERY.

SPECIFICATION forming part of Letters Patent No. 450,840, dated April 21, 1891.

Application filed December 16, 1890. Serial No. 374,869. (No model.)

*To all whom it may concern:*

Be it known that I, CHARLES WILLMS, a citizen of the United States, residing at Baltimore, in the State of Maryland, have invented certain new and useful Improvements in Electric Batteries, fully described and represented in the following specification and the accompanying drawings, forming a part of the same.

This invention relates to electric batteries, and especially to that class of small portable batteries in which are used sealed cells inclosed within cell-cases of wood, rubber, or other suitable material, its object being to provide an improved construction of cell-case for such batteries. In these batteries the cell containing the battery material is generally made of glass or other fragile material, and the chemical reactions within the cell are liable to burst the cell and cell-case, the result being that the battery material is permitted to run out, damaging other parts of the battery and wasting the battery elements. The cells, moreover, are generally closed and sealed by means of end plugs, and these plugs are liable to be forced out by the pressure of the battery material, this resulting also in the passage of the material to the outside of the cell-case and consequent damage to other parts of the battery and loss of the battery material, as by the bursting of the cell. I prevent the bursting of the cell-case and loss of the battery material by making the cell-space larger than the cell, whereby the pressure of the bursting cell is not transmitted directly to the cell-case as when the cell fits closely therein; but the expansive force of the battery elements is exhausted within the space about the cell, this construction also affording space for the battery material inside the cell-case when released from the cell either by bursting of the cell or forcing out of the plug, and I preferably place some suitable absorbent material in the space about the cell, so that the liquid battery material is taken up and all danger of leakage from the cell-case avoided. I provide, also, a construction by which the ends of the tube forming the cell are supported directly by the cell-case, so that the pressure upon the end sealing-plug tending to force it out is resisted by the cell-case, and I preferably close the cell-case at one end by a screw cap or plug, by which the cell is forced against the opposite end of the cell-case and the required end pressure produced.

A detailed description of constructions embodying my invention will now be given, and the special features constituting the invention pointed out in the claims.

Figure 4:
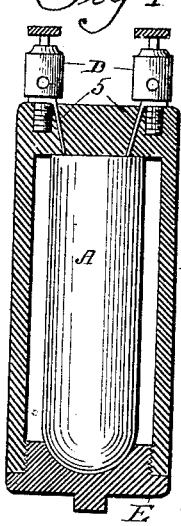
Figure 2:
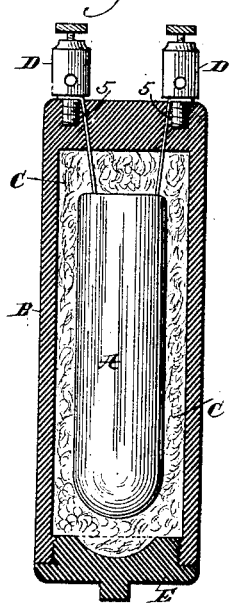
Figure 3:
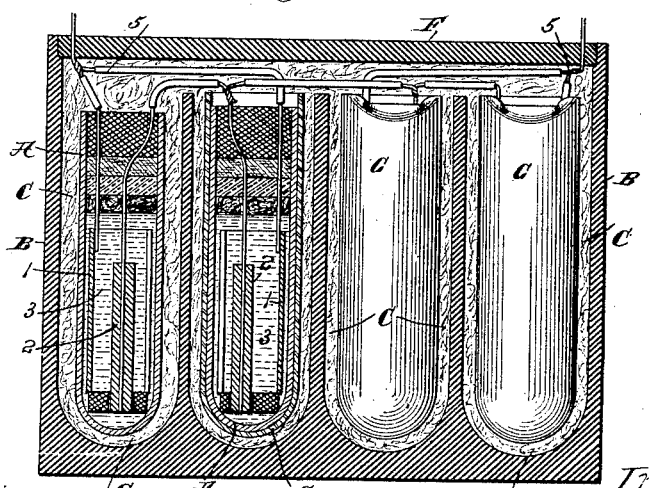

In the accompanying drawings, Figure 1 is a section showing the preferred form of cell-case with a single cell constructed in accordance with my invention. Fig. 2 is a similar view showing a modification. Fig. 3 is a section of a cell-case containing four connected cells. Fig. 4 shows a construction similar to that of Fig. 1, omitting the absorbent material.

Referring now particularly to Figs. 1 and 4, A is the cell, which may be of any suitable sealed-cell construction; but I prefer to use the chloride-of-silver dry cell shown and described in Patents Nos. 437,469, 421,801, 414,627, 403,451, 374,863, and 374,862, and I have shown a cell of the construction of Patent 421,801, in which the cell consists of a tube containing the battery elements—viz., zinc plate 1, chloride-of-silver rod 2, and the solution of sulphate of zinc 3—the tube being permanently closed at one end and sealed at the other end by a stopper 4, through which the conductors 5 pass and which consists of four parts, as described in that patent. The cell A is inclosed within a cell-case B of wood, rubber, or other suitable material, the cell-space being larger than the cell and preferably filled with cotton or other suitable absorbent material C, as shown in Fig. 1. The cell-case B is permanently closed at one end and the conductors 5 pass through this end to the binding-posts D. The opposite end of the cell-case is open for the introduction and removal of the cell, and is preferably screw-threaded and closed by means of a screw cap or plug E, which presses against the closed end of the cell-tube and forces the plug end against the opposite end of the cell-case as the cap or plug is screwed in to close the cell-case. It will be seen that by this construction the expansive force of the bursting cell is largely exhausted in the space about the cell before producing pressure upon the cell-case, and space is afforded about the cell for the liquid battery material freed by the bursting or by the forcing out of the plug. The absorbent material also takes up the fluid material escaping from the cell, so that no passage of the liquid battery material outside the cell-case is possible, and there is no waste of material, as the absorbent and the battery material taken up thereby can readily be removed from the cell by removing the screw-cap. The sealing-plug, also, is held firmly in position by means of the end supports afforded by the cell-case.

Fig. 2 shows a modification in which the feature of supporting the ends of the cell by the cell-case is omitted, the cell being surrounded on all sides by absorbent material. In this case the end plug may be held by contracting the mouth of the tube, as shown, or any other suitable means may be used for this purpose.

In the construction shown in Fig. 3 the cell-case B consists, preferably, of a solid block of wood, in which are formed a series of cell-spaces larger than the cells to be inserted therein. In each of these cell-spaces is placed a cell A, the conductors 5 of the cells being connected together, preferably inside the cell-case, as shown, and the cells being inclosed within the cell-case by means of a cover F, secured over the open ends of the cell-spaces by screws or in any other suitable manner. All the cells may be surrounded by re-enforcing metallic sheaths G, as shown in one of the cells in section and in two in elevation, this re-enforcing sheath being strong enough to resist bursting, and the space outside the metallic sheath being filled with absorbent material, or the re-enforcing sheaths may be omitted, as shown in the cell at the left hand of the figure. In this construction, where a number of cells are connected together, the end supports can be used by extending the electrodes outside the cover of the cell-case. In the construction shown, however, the end plugs will be held in place by other means, preferably by contracting the whole or a part of the mouth of the re-enforcing sheath over the top of the plug, as shown, and the absorbent material arranged to fill the space between the end of the cell and the cover of the cell-case, as well as the space about the sides of the cell.

With the re-enforcing sheath the bursting of the cell-case by side pressure directly from the bursting cell is avoided; but the bursting of the cell tends to burst the cell-case by the passage of the material to the outside of the sheath through the open end of the latter, and the space and absorbent about the sheath perform the same functions as in the construction omitting the sheath.

What I claim is—

1. The combination of a sealed battery-cell and an inclosing case of wood, rubber, or other similar material having a cell-space larger than the cell and affording space for the battery material when released from the cell, substantially as described.

2. The combination of a sealed battery-cell, an inclosing case of wood, rubber, or other similar material having a cell-space larger than the cell, and absorbent material in said space about the cell, substantially as described.

3. The combination of a battery-cell sealed by an end plug and an inclosing case of wood, rubber, or other similar material supporting directly the ends of the cell, but having a cell-space larger in cross-section than the cell, substantially as described.

4. The combination of a battery-cell sealed by an end plug, an inclosing case of wood, rubber, or other similar material supporting directly the ends of the cell, but having a cell-space larger in cross-section than the cell, and absorbent material in said space about the sides of the cell, substantially as described.

5. The combination of a sealed battery-cell, a re-enforcing metallic sheath, and an inclosing case of wood, rubber, or other similar material having a cell-space larger than the cell, substantially as described.

6. The combination of a sealed battery-cell, a re-enforcing metallic sheath, an inclosing case of wood, rubber, or other similar material having a cell-space larger than the cell, and absorbent material in said space about the sides of the cell, substantially as described.

7. The combination of a series of connected sealed battery-cells, an inclosing case of wood, rubber, or other similar material having a series of cell-spaces larger than the cells, and absorbent material in the spaces about the cells, substantially as described.

8. The combination of a series of connected sealed battery-cells, a re-enforcing metallic sheath about each cell, an inclosing case of wood, rubber, or other similar material having a series of cell-spaces larger than the sheathed cells, and absorbent material in the spaces about the cells, substantially as described.

9. The combination of a battery-cell sealed by an end plug and a cell-case closed by a screw cap or plug engaging one end of the cell and forcing the opposite end against the cell-case, substantially as described.

10. The combination of a battery-cell consisting of a tube permanently closed at one end and sealed at the open end, and a cell-case closed by a screw cap or plug engaging the closed end of the tube and forcing the sealed end against the cell-case, substantially as described.

In testimony whereof I have hereunto set my hand in the presence of two subscribing witnesses.

CHAS. WILLMS.

Witnesses:
 GEO. PINKNEY SHERMAN,
 C. ROSS MACE.